United States Patent
Spier et al.

(10) Patent No.: US 8,001,423 B2
(45) Date of Patent: Aug. 16, 2011

(54) PROGNOSTIC DIAGNOSTIC CAPABILITY TRACKING SYSTEM

(75) Inventors: Carolyn Spier, Nashua, NH (US); Daniel E. Mills, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 81 days.

(21) Appl. No.: 12/548,683

(22) Filed: Aug. 27, 2009

(65) Prior Publication Data

US 2010/0083056 A1    Apr. 1, 2010

Related U.S. Application Data

(60) Provisional application No. 61/100,459, filed on Sep. 26, 2008.

(51) Int. Cl.
G06F 11/00 (2006.01)

(52) U.S. Cl. ............................................ 714/26; 714/30

(58) Field of Classification Search ...................... 714/26
See application file for complete search history.

(56) References Cited

U.S. PATENT DOCUMENTS

| | | | |
|---|---|---|---|
| 5,544,308 A * | 8/1996 | Giordano et al. | 714/26 |
| 6,928,345 B2 * | 8/2005 | Quinn | 701/29 |
| 7,043,661 B2 * | 5/2006 | Valadarsky et al. | 714/4 |
| 7,260,501 B2 * | 8/2007 | Pattipatti et al. | 702/183 |
| 7,496,798 B2 * | 2/2009 | Link et al. | 714/47 |
| 2006/0242288 A1 * | 10/2006 | Masurkar | 709/223 |
| 2007/0005202 A1 * | 1/2007 | Breed | 701/29 |
| 2007/0067678 A1 * | 3/2007 | Hosek et al. | 714/25 |
| 2008/0040152 A1 * | 2/2008 | Vian et al. | 705/2 |

OTHER PUBLICATIONS

Pattipatti et al, An Integrated Diagnostic Process for Automotive Systems, Studies Computational Intelligence in Automotive Applications, 132, 191-218 (May 28, 2008).

Karsai et al, Model-based Software Tools for Integrated Vehicle Health Management, Second IEEE International Conference on Space Mission Challenges for Information Technology, 2006. SMC-IT 2006, 8 pages.

Faas et al, Vehicle Health Management Research for Legacy and Future Operational Environments, IEEE Systems Readiness Technology Conference AUTOTESTCON Proceedings, Aug. 20, 2001, 718-729, 2001.

K Pattipati et al., An Integrated Diagnostic Process for Automotive Systems, Studies in Computational Intelligence (SCI), 191-218, Springer-Verlag Berlin Heidelberg 2008.

G. Karsai et al., Model-based Software Tools for Integrated Vehicle Health Management, 2nd IEEE International Conference on Space Mission Challenges for Information Technology, 2006.

P. Faas et al., Vehicle Health Management Research for Legacy and Future Operational Environments, IEEE, 2001.

* cited by examiner

*Primary Examiner* — Scott Baderman
*Assistant Examiner* — Kamini Patel
(74) *Attorney, Agent, or Firm* — Daniel J. Long; Robert K. Tendler (57) ABSTRACT

A universal on-board system is provided for automatic fault detection and on-the-spot repair instructions that includes a module adapted to be coupled to a wide variety of platforms and Line Replaceable Units.

15 Claims, 5 Drawing Sheets

PROGNOSTIC DIAGNOSTIC CAPABILITY TRACKING SYSTEM

RELATED APPLICATIONS

This Application claims rights under 35 USC §119(e) from U.S. Application Ser. No. 61/100,459 filed Sep. 26, 2008, the contents of which are incorporated herein by reference.

FIELD OF THE INVENTION

This invention relates to a prognostic, diagnostic capability tracking system and more particularly to a universal application-adaptable on-board module which may be coupled to a wide variety of platforms (land vehicles, aircraft, ships) that detects faults, and without human intervention controls the platform to analyze and diagnose the causes of platform faults and provide immediately-accessible repair instructions based on a determination of the unique likely cause of a failure.

BACKGROUND OF THE INVENTION

In both military and commercial environments, platforms or Line Replaceable Units, LRUs, often fail in the field and it is up to maintenance personnel to be able find a fault, determine its cause and repair the platform or LRU. This usually involves bringing the platform or LRU to a repair facility.

Line Replaceable Units are self-contained modules that can be replaced by removing the LRU from its host platform and sending it to a maintenance depot where maintenance personnel determine the cause of the malfunctioning unit and either fix it or replace it. Thereafter, the unit is installed back into the platform from which it came.

While maintenance manuals exist to assist mechanics and maintenance personnel to determine the cause of a fault and to fix it, there is oftentimes a misconception that when a fault indication occurs, one immediately knows the cause of the fault.

From a motor vehicle point of view, oftentimes an engine light is illuminated indicating a fault. However, the cause of the engine light illumination is not immediately apparent from the fault indication. Thus many fault detection systems do not explain the root cause of the system fault so that it is impossible to ascertain which one item needs to be repaired or replaced. As a result, mechanics or maintenance personnel are at a loss to determine solely from the indicator the cause of the fault. Maintenance manuals and external software tools help but often lead the maintainer down a path of trial and error.

The result is that LRUs are transported to a maintenance depot to troubleshoot the unit. This can result in indiscriminate swapping out of parts which removes the part as an available spare and oftentimes results in the breakage of the parts that are being swapped out; and this occurs as much as fifty percent of the time. Moreover, the industry estimates that for a large number of fault indications, the fault indicators are not necessarily valid. Thus, mechanics or maintenance personnel oftentimes do not know what to do in the face of failure indicators and oftentimes send failed units directly back to the manufacturer. Moreover, the industry estimates that as much as 200 billion dollars a year are expended on replacing parts that were never broken.

There is therefore a need for an on-board readily-adaptable universal module which not only can detect the fact of a fault, but also controls the platform to perform diagnostic tests that indicate the likely sole cause of the fault and provide targeted repair instructions.

While a large number of field manuals exist, they are not necessarily as useful as they might be because of the massive amounts of information in the manual and that included diagnostic strategies were developed without access to the range of failure situations that can occur. Thus, a soldier in the field upon feeling a rough running engine may be in a quandary as to whether or not the engine is fixable on-the-spot, whether the vehicle can be run as-is, or whether the vehicle must be returned to a maintenance depot. For instance, for a rough-running engine it is not clear whether the rough running engine will propel the vehicle up an incline so that it can keep going, or whether by continuing to run the vehicle, further damage to the vehicle will occur, or the vehicle will completely fail.

This being the case, there is a requirement for an on-board monitoring and diagnostic module to be able not only to detect the health of whatever platform is involved, but also to provide the most likely cause of the problem as well as to provide targeted step by step instructions as to how to fix the problem, and if possible warn of an upcoming failure.

Additionally while diagnostic systems tailored to specific platforms are available, there is also a need for an application-adaptable universal on-board monitoring and diagnostic system that can be connected to any platform so that it seamlessly adapts to the platform and controls it to be able to perform the diagnostic steps.

By way of further background, U.S. Pat. Nos. 6,928,345 and 7,260,501, as well as patent publication 2008/0040,152 describe various health management systems as well as Intelligent Model-Based Diagnostics. As to the above-mentioned patent publication assigned to the Boeing Company, it will be appreciated this Boeing system patent covers an off-board process. The off-board process requires manual interaction with the platform or LRU to exercise the platform so that the reasoners that are used can determine the cause of the fault. Although the Boeing system does employ an on-board system, this on-board system does not detect faults, but merely collects data. Therefore there is only one level of diagnostics involved.

Secondly, U.S. Pat. No. 7,260,501, the patent to Pattipati et al., while it does perform fault detection and returns multiple possible suspects, there is no fault isolation. Moreover, the Pattipati system includes an off-board system that requires manual intervention to perform testing in that it does not connect to the platform itself when doing its diagnosis. Finally, since the Pattipati fault isolation system is off-board, its interfaces cannot be adapted for different platforms and is merely a replacement for maintenance manuals.

With respect to U.S. Pat. No. 6,928,345, this Honeywell system describes a service-oriented architecture in which loosely coupled layers are employed that are very slow and cannot run in real-time. Moreover, the Honeywell system is not adaptable to various platforms absent reprogramming. Also the Honeywell system is not an on-board program, but is rather intended to run at a diagnostic center. Finally, the Honeywell system requires that manual input to run a testing procedure that prevents it from functioning as an on-board system.

Note also K Pattipati et al., *An Integrated Diagnostic Process for Automotive Systems*, Studies in Computational Intelligence (SCI), 191-218, Springer-Verlag Berlin Heidelberg 2008; G. Karsai et al., *Model-based Software Tools for Integrated Vehicle Health Management*, $2^{nd}$ IEEE International Conference on Space Mission Challenges for Information Technology (SMC-IT'06); P. Faas et al., *Vehicle Health Management Research for Legacy and Future Operational Environments*, IEEE, 2001.

It will be noted that these systems are specially tailored for the applications they monitor. As such they are stand alone systems and do not address the special requirements and architectural constraints necessary to execute model-based diagnostics on various platforms in real-time.

SUMMARY OF INVENTION

In order to solve the problem of multiple platforms and real-time requirements a universal on-board system is provided for automatic fault detection and on-the-spot repair instructions that includes a module adapted to be coupled to a wide variety of platforms and Line Replaceable Units (LRU). The system offers step by step repair instructions through the use of multiple levels of diagnosis involving rapid, accurate evaluation of the state of the platform or LRU to which the module is coupled, with the system isolating the unique likely cause of failure for any detected fault. Once the unique cause is determined, detailed targeted repair instructions are provided to address the cause of the fault, with the repair instructions optionally including video instructions. The fault cause accuracy and resulting targeted repair instructions significantly reduce the time it takes to analyze a fault in the field to find its cause, and both reduces unnecessary ordering and replacement of parts, and in some cases can eliminate transporting the LRU to a repair depot.

The fault detection and cause analyses constitute at least two diagnostic levels that are performed by the subject module. Moreover, the module is configured by a rules set tailored to each platform to monitor the platform. This provides rapid re-configurability for virtually any application without reprogramming of the module.

In one embodiment, the rules set configures a data manager to condition signals from the platform so that the module can adapt and respond to any number or types of signals that are available. The rules set also configures a health monitor component, a diagnostic component and a prognostic component, causing each to selectively invoke a number of dynamic diagnostic and prognostic reasoners to operate on models that are constructed to map failure propagation through the monitored platform. The selected dynamic reasoner analyzes information provided by the health monitor against a corresponding model or models to help arrive at the unique cause or source of a particular problem, thereby eliminating false guesses and the possible replacement of parts that have not failed.

As used herein, the term dynamic referring to a reasoner denotes the ability to develop a reasoner-based test strategy on-the-fly, in which all of the test points that are passing and all the test points that are failing are continuously monitored. These pass/fail test points are analyzed against the platform model to instantaneously determine the best test strategy.

Thus in a dynamic reasoner the test strategy employed by the reasoner is dynamically varied in accordance with the continuously monitored passing and failing test points to configure the reasoner to utilize the best instantaneously-determined test strategy.

It will be noted that, the rules set also includes instructions detailing the actions to be taken in the event a selected reasoner is not able to reach a conclusion.

In the above embodiment an abductive reasoner is used to analyze the associated model to hypothesize the cause of failure, with its output coupled to a Bayesian mechanism to calculate the probability that the hypothesis is correct. In addition to the abductive reasoners, neural reasoners may be used that employ pattern recognition to recognize performance conditions that are going out of tolerance based on past history which may be useful despite the fact that history may not accurately reflect fault cause. Fault dictionary reasoning is not dynamic but may be used, and physics-based reasoners while complex and particularized to a specific set of phenomena may be useful. Rules-based reasoning can be employed which although not dynamic, models the experience of a skilled technician using fault trees (IF symptom . . . THEN failure cause).

Thus, there are many types of reasoners, each providing particular benefit for different portions of a system being modeled. Therefore, the subject module is adapted to the particular application it is coupled to, and is able to select among a number of dynamic and static reasoning engines and models in order to best predict, detect and isolate failure causes for generating on-the-spot repair instructions.

A graphical user interface is employed to display health monitor suspect lists, the likely cause of a detected failure and its probabilities and criticalities, prognostic alerts, operator action requests and inputs, and details of repair procedures, or remove and replace procedures.

The module also includes a fault isolation step execution component to perform platform control and any necessary operator actions, as well as a report manager to format and store time-stamped information for electronic output.

While the subject invention will be described in terms of vehicle health monitoring, diagnostic and prognostic systems, it will be appreciated that vehicle health is only one type of application for which the subject system is useful. Rather, the subject system may be applied to radars, jammers, any type of computer platform, or in fact any platform for which monitoring signals are available.

Moreover, the system is made to be applicable both during tactical phases where the platform is performing its mission, such as a vehicle transporting personnel, and a maintenance phase in which the platform may safely undergo fault-isolation activities, such as when a vehicle is pulled to the side of the road. Note that health monitoring capability including fault detection and some prognostics are available when the vehicle is running, whereas the diagnostics and other prognostics are available only when the vehicle is in its maintenance state.

More particularly, in a preferred embodiment, the subject module that is either embeddable in the platform or LRU, or is attachable to it utilizes dynamic abductive reasoning to ascertain the cause of the fault. In this type of reasoning one makes a graphical model of the system platform or LRU. The graphical model provides descriptions of failure modes, how they propagate through the system and affect signals, and representations of internal test points and internal test strategies, such as built in test, and signals going out of range. The dynamic reasoner will receive a continuously-updated list containing the state of all internal tests and strategies, passes and fails, and analyze them against the model to determine what failure modes could have caused the specific combination of passed and failed tests. It is the resultant location of the determined failure mode within the system model that makes possible the determination of the cause of the fault.

In the preferred embodiment, the subject universal module analyzes information in four ways:

1. In real-time, data from a platform is parsed, transforms are applied and time-tags are added. For those parameters designated, evaluation against limits is also performed to determine pass/fail status. Different persistence and filtering counts may also be added to any subset of the data.

2. A small-profile set of dynamic reasoning algorithms operate on the processed information to determine probable causes of detected failures. These causes constitute an ambiguity group. This information is available to an operator to facilitate a call for possible replacement parts from a separate location. The subject system provides help to assess the situation to determine the best course of action. In one embodiment, the ambiguity group is saved for Maintenance Mode Diagnostics.

3. Starting from either the saved ambiguity groups determined during health monitoring or from a new collection, the ambiguity groups are input to a large profile set of maintenance mode dynamic reasoning algorithms. When the processing is proceeding links are provided to electronic tech manual pages for detailed descriptions of actions to be taken. In addition, the results of the reasoning algorithms may determine that the platform needs to be transitioned to a specific state. When the subject module is directly connected to the platform buses, it will output the commands to automatically activate that state, thus eliminating manual interaction. It may also automatically retrieve information from sub-systems to evaluate the results of the state changes. In addition, the subject module, while on the platform, may be connected to external test equipment buses to control that equipment when needed to make specific measurements or provide specific stimulus in the execution of special tests.

4. Specific tagged data is collected during health monitoring that forms one of the inputs to prognostic algorithms for execution during the maintenance operation.

As to system architecture, the subject on-board module is a highly adaptable general purpose prognostics and diagnostics manager. The design includes a unique combination of features to support adaptability and generality provided by a number of key software features.

First, the on-board module design incorporates human readable and editable rules that adapt the primary configuration and control.

Secondly, when incorporating the on-board module into a system, the data input sub-system and/or the user interface sub-system may already be defined. The on-board module also incorporates a software adapter layer for each of these interfaces such that the adapter can be customized to the application environment without any additional changes to the on-board module code.

Thirdly, appropriate dynamic reasoning algorithms are determined by the requirements of a specific application including, but not limited to, issues such as mode, application technology domains, user preferences, software availability, cost and performance. The subject module uses a rules set to select the currently active reasoner from the set of included reasoners and incorporates a software adapter layer for each reasoner. In this way the adapter can be customized to each reasoner interface without any additional changes to the on-board module.

Fourthly, for each end user application and system, unique input data processing may be required to perform functions such as scaling, filtering, de-bounce, rate calculations and derived parameters. In the subject module input processing capabilities are provided through built-in functions that can be extended by adding custom scripts. The rules capability is used to assign the correct functions to each input data parameter. This combination of built-in functions, scripts and rules allows unlimited customization without changing the on-board module itself.

Fifthly, when operating the on-board module in a maintenance mode it is common that system-specific manual, automated and semi-automated fault isolation tests may be required. The on-board module design provides scripting functionality to support these custom tests without modifying the on-board module.

Finally, user-defined output data processing such as log files and reports are supported through the use of plug-ins, or separately built software application modules, with the rules set used to customize the loading and execution of the appropriate plug-ins.

In general, failure mode analysis and testability analysis is accomplished offline to create the model or models required. A model is then processed into a mathematical representation.

Note, rather than providing simple fault monitoring, analyzing the flow of signals in the platform in real-time using a dynamic reasoner and following the propagation of the built-in-test (BIT) failures as they transverse a model permits the discovery of what could have caused the failure or failures.

Whether using dynamic reasoning or not, the subject system operates on a number of different models and reasoners to ascertain the most likely cause of the particular fault.

Note that a reasoner is a mathematical tool that analyzes fault collections, responses from automatic tests, or responses to questions and then analyzes the incoming information against a model.

Thus, whether the on-board module calls up a dynamic reasoner, a neural reasoner, a physics-based reasoner, a fault dictionary or a rules-based reasoning engine, the subject system is configured to the particular platform or LRU involved by a rules set that determines what should be done to analyze a particular platform or LRU and then provides visibility into upcoming failures, the likely cause of a detected fault, and step by step repair instructions on-the-spot to permit field repair.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
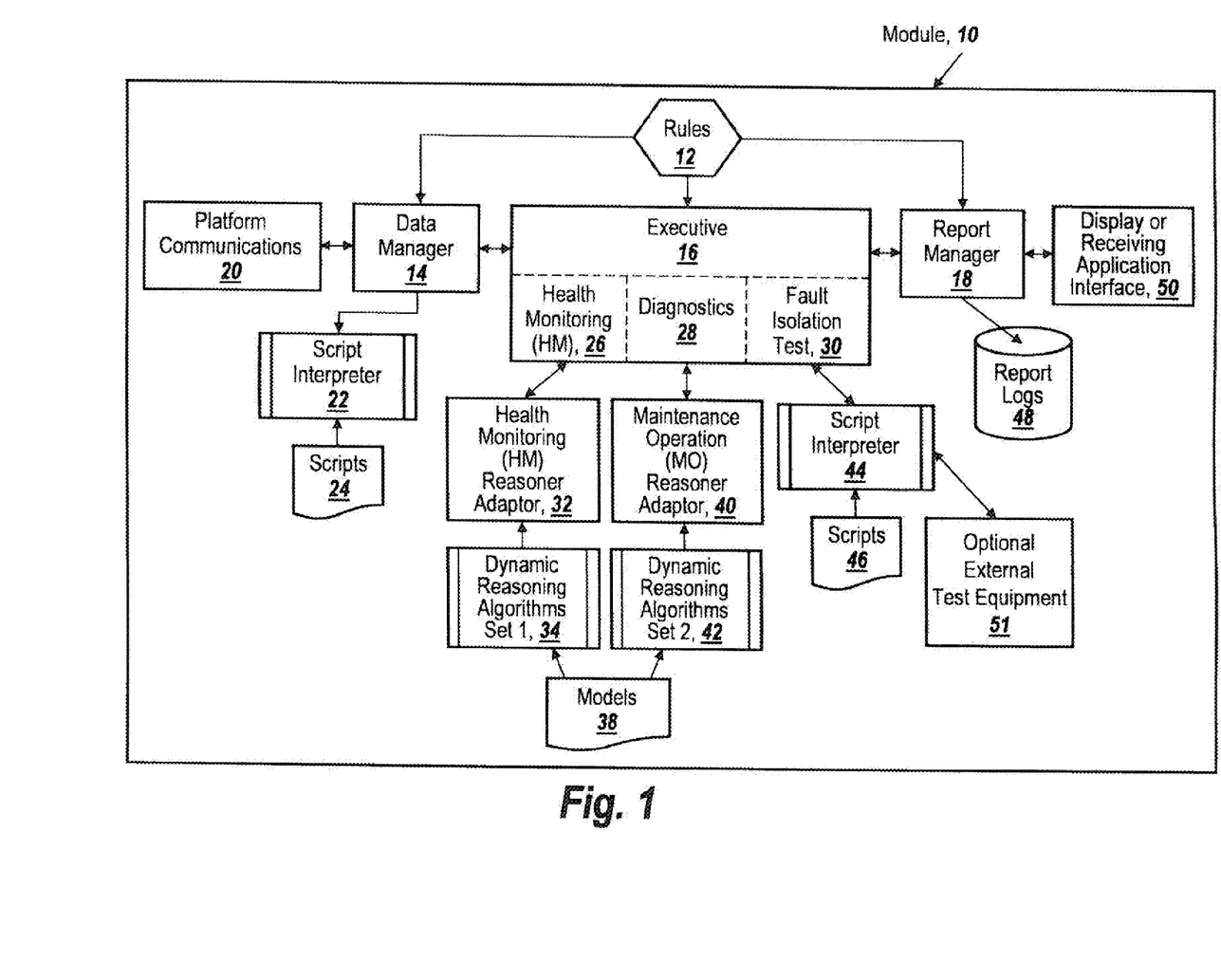
FIG. 1 is a diagrammatic representation of the prognostic, diagnostic capability tracking system module illustrating the configuration of the module using a rules set that is coupled to a data manager, an executive program and a report manager, with the data manager coupled to a script interpreter and with the executive program including a health monitoring, diagnostics and fault isolation test functions; and, FIGS. 2-6 are flow charts describing the operation of the module of FIG. 1.

Referring now to FIG. 1, a module 10 is either embedded or connected to a platform or LRU which performs a prognostic and diagnostic function to detect faults and to analyze and diagnose the causes of the faults of the platform to which it is coupled.

In order for the module to adapt to any of a wide variety of applications, module 10 is provided with a rules engine 12 which is coupled to a data manager 14, an executive program 16 and a report manager 18.

The rules are modified or adapted for each of the platforms or LRUs the module is to monitor, with platform communications 20 connecting module 10 to the particular platform involved.

Data manager 14 is coupled to a script interpreter 22 which is provided with scripts 24, thus to be able to translate the platform communications format to a universal format usable by module 10 as well as to perform translation, and transformation of the input data.

Executive program 16 controls three functions, namely a health monitoring function 26, a diagnostic function 28 and a fault isolation test function 30.

Health monitoring function 26 utilizes a health monitoring reasoner adapter 32 to which is coupled one or more dynamic reasoning algorithms 34 which are in turn provided with models 38 of the platform or LRU.

The diagnostics function is performed by a maintenance operation reasoner that includes an adapter 40 which is provided with one or more dynamic reasoning algorithms 42 that access models 38.

As to the fault isolation test function 30, this function is coupled to a script interpreter 44 provided with scripts 46. The script interpreter function can ask for manual instructions to be displayed, special bus commands through the data manager 14 to control the platform, and commands to external test equipment 51 to generate stimulus or take measurements automatically for specific fault isolation test steps 30.

The output of the executive program is coupled to report manager 18 which outputs reports to a log reporter 48 and to a display or a receiving application interface 50 to output the cause of a fault and instructions for the repair of the cause of the fault. The report manager also accepts operator inputs from the receiving application interface.

It is the purpose of module 10 to collect and process platform data, to apply transforms and perform analysis and prognostic calculations, with the information collected being time stamped and formatted for off-board transfer and processing. Note, it is the function of data manager 14 to collect and process the platform data.

As to the health monitoring function 26, module 10 collects and processes platform data and performs the health monitoring function by applying transforms and by performing trend analysis and prognostic calculations. The non-invasive analysis of detected failures is performed continuously during the normal operation of the platform in which one or more low profile reasoners may be utilized.

The health monitoring functionality also applies to embedded applications for analysis of built in test or BIT results when these results are embedded within a single LRU or embedded within the electronic control module of a platform sub-system. Note that all events are saved, time stamped and available for off-board evaluation.

As to diagnostic function 28, the diagnostics can start from the results of the on-board health monitor or the operator can select a specific LRU or subsystem. The diagnostic function will provide pass/fail information to the selected dynamic reasoning algorithm from Set 2 at 42, via the maintenance operation reasoner adapter 40. The selected reasoner will provide the name of the next fault isolation test to execute in order to fault isolate the failure. The diagnostic function 28 will then pass the name of the fault isolation test to be executed to the fault isolation test function 30 which will determine the related script to be run. The fault isolation test function will start script interpreter 44, providing it with the name of the script to be executed.

The diagnostic function 28 may employ multiple reasoners to support differing technologies. Fault isolation test function 30 controls platform and external test equipment to make testing as automatic as possible. Diagnostics in combination with fault isolation test 30 results in the reporting of maintenance actions and information to off-board systems for evaluation and continuous improvement. Finally, the diagnostics and fault isolation test functions effectively turn a Class 1 electronic technical manual into a Class 5 interactive electronic technical manual.

Utilization of the subject module enables continuous fault monitoring, fault detections, generation of alerts and warnings, entry into either tactical or maintenance modes, and provides prognostic data collection. Note that the subject system provides non-intrusive fault isolation, mission capability assessment, consumable/inventory status and configuration or state status.

Moreover, the system can provide intrusive fault isolation, remove and replace support, fault/maintenance event resolution, and fault/maintenance event logging during a session. The system also provides for a diagnostic event trace store capability, a prognostic/data collection store capability, maintenance event log storage and consumables or configurations storage.

Figure 2:
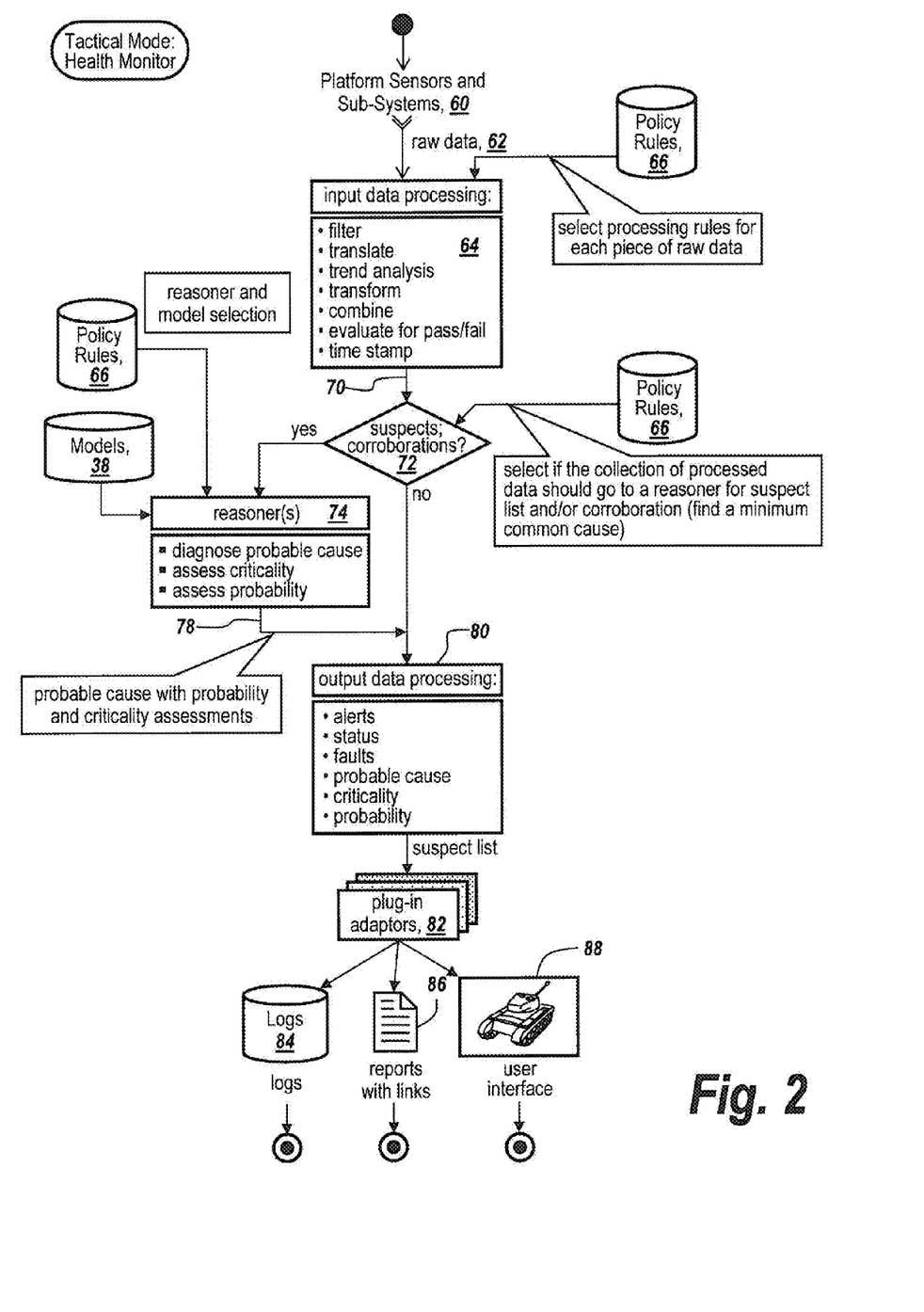

Referring now to FIG. 2, what is presented is a flow chart illustrating the operation of the health monitor in the tactical mode. It is the purpose of the health monitor to detect faults and provide a suspect list of possible causes for a fault. It also is useful to generate alarms and alerts and uses relatively low level reasoners that can isolate readily recognizable causes of certain types of faults. It is also capable of assigning probabilities and criticalities to faults so that their existence and severity can be displayed.

As can be seen, platform sensors and sub-systems 60 input raw data 62 into an input data processing node 64, represented by data manager 14 in FIG. 1, that is under the control of policy rules 66 from rule engine 12 of FIG. 1 which govern the selection of processing transforms for each piece of raw data.

As to the input data processing node 64, the raw data 62 is filtered and translated, and a trend analysis is performed, with the data being transformed, combined, and evaluated for pass/fail characteristics so that the system can, at least, ascertain whether the platform has passed or failed in any of its monitored functions. Input data is also time stamped.

Policy rules 66 specify if the result of the input data processing and the evaluation for pass/fail 70 are to be sent to a reasoner for corroboration 72. This will be the case, when based on the failures occurring, an immediate replaceable source or suspect list cannot be calculated simply. Corroboration is the determination of the minimum set of suspects that can cause the collection of passes and fails collected. If corroboration is required, a tactical mode reasoner 74 is selected which will provide a minimum list of suspects 78 with their probabilities and criticality. The models used by the selected reasoner, are available from models 38 of FIG. 1.

If a reasoner is used or not, the suspect list will go to the output data processing node 80, represented in FIG. 1 as the report manager 18, report logs 48, and display or receiving application interface 50. Output data processing block 80 outputs via a number of plug-in adapters 82 to store or log the output data, as illustrated at 84; to generate reports and links as illustrated at 86; or to provide user interface information 88 which includes alerts and suspect lists.

The process of collecting data and arriving at a suspect list with probabilities and criticalities is repeated as often as specified by the policy rules 66. Typically, this can be once every second.

Figure 3:
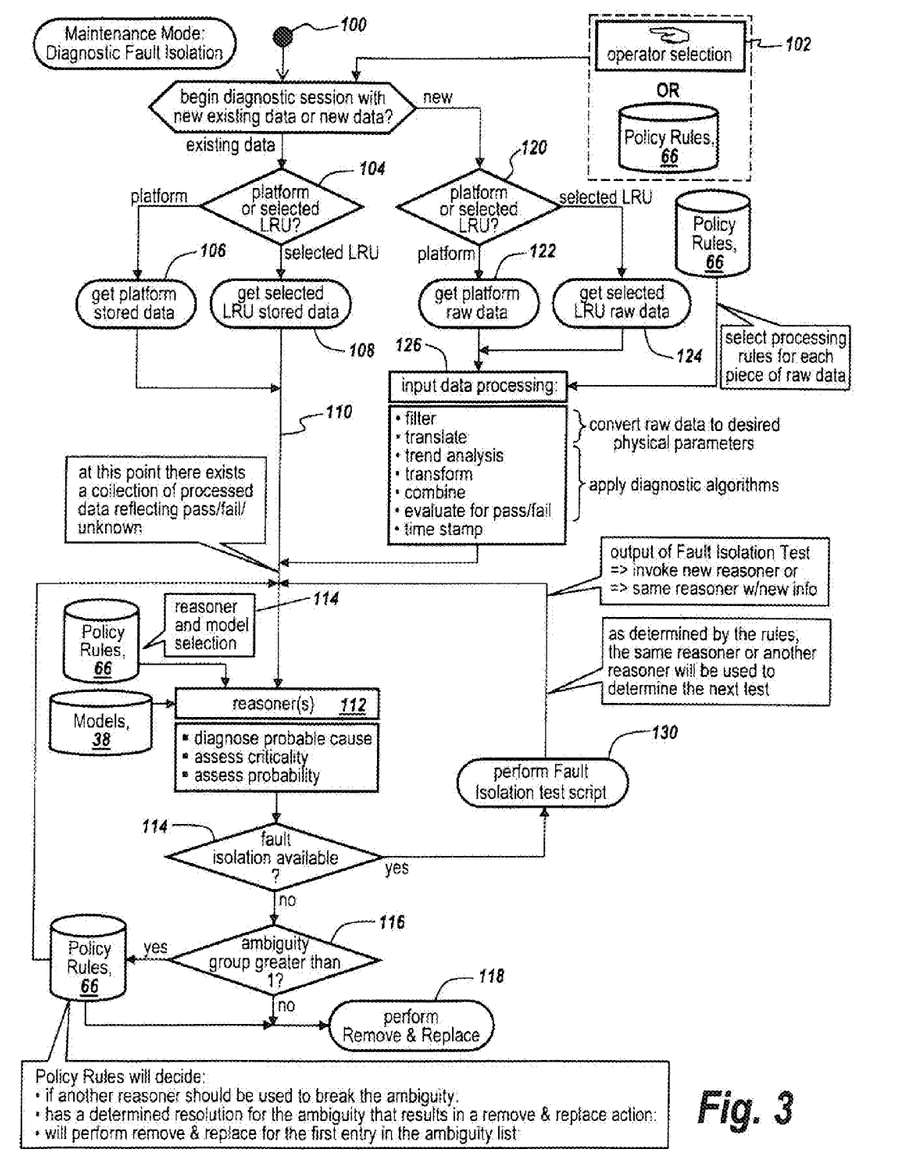

It will be appreciated that in the tactical mode the platform can be in normal operation, whereas as illustrated in FIG. 3 the system enters a maintenance mode for diagnostic fault isolation, assuming that a single replaceable part was not immediately determined in the tactical mode or if remove and replace instructions are needed.

The maintenance mode is run when the platform is not required to perform its mission and is used to diagnose the cause of a fault from the likely suspects list, with the maintenance mode invoking higher functionality reasoners.

Here as can be seen at 100, the system begins a diagnostic session with new or existing data. The maintenance mode may proceed by operator selection as shown at 102, or by policy rule 66 intervention.

If existing data is to be utilized, decision block 104 determines whether platform data is to be selected as illustrated at 106, or whether the data for a specific LRU is to be selected as illustrated at 108.

The output, as illustrated at 110, indicates that there exists a collection of processed data reflecting pass/fail/unknown characteristics which are to be applied to reasoners 112 based on reasoner and model selection 114 governed by policy rules 66. Selected models 38 are coupled to reasoners 112 to diagnose the probable cause of the fault, to assess criticality and to assess probability. The selected maintenance mode reasoner is more sophisticated than those associated with the tactical mode. Therefore, the additional piece of information it provides is the name of the next test that needs to be performed in order to isolate the failure to a single replaceable component. If the reasoner can supply the name of the next test to the diagnostics module 28 of FIG. 1, decision block 114 representing the diagnostics model will provide the information to fault isolation test module 30. The fault isolation test module will then execute the test at operation 130. Upon completion of the test, the policy rules will specify how to handle the results. The new piece of information can go to the originating reasoner or to another reasoner to determine the next fault isolation test to be executed.

If the reasoner cannot supply the name of a next test to diagnostic module 28 of FIG. 1 at decision 114, and the ambiguity group is one at decision block 116, then the remove and replace instructions 118 are presented via the report manager. If the ambiguity group is greater than one at decision block 116, then policy rules 66 will determine the course of action to be taken. The policy rules can either request, at operation 118, that the operator remove and replace the first component on the ambiguity list, or redirect diagnostic module 28 of FIG. 1 to send pass/fail information to another reasoner 112.

Going back to the start of the maintenance mode at 100, the operator could have selected to start the session with new data. In that case, the operator can select, at decision block 120, to have the subject module collect data from the entire platform as shown at operation 122, or from a specific LRU as shown at operation 124. The resultant data is processed at block 126 under control of policy rule 66 selecting the processing rules for each new piece of raw data, converting new raw data to desired physical parameters and applying selected diagnostic algorithms. The conversion of the new raw data involves filtering and translation, whereas the applying of the diagnostic algorithms includes trend analysis, transforms; combinations and evaluations for pass/fail.

The output of block 126 is then applied to reasoner block 112 wherein the processing is identical to the processing that occurred with existing data.

Figure 4:
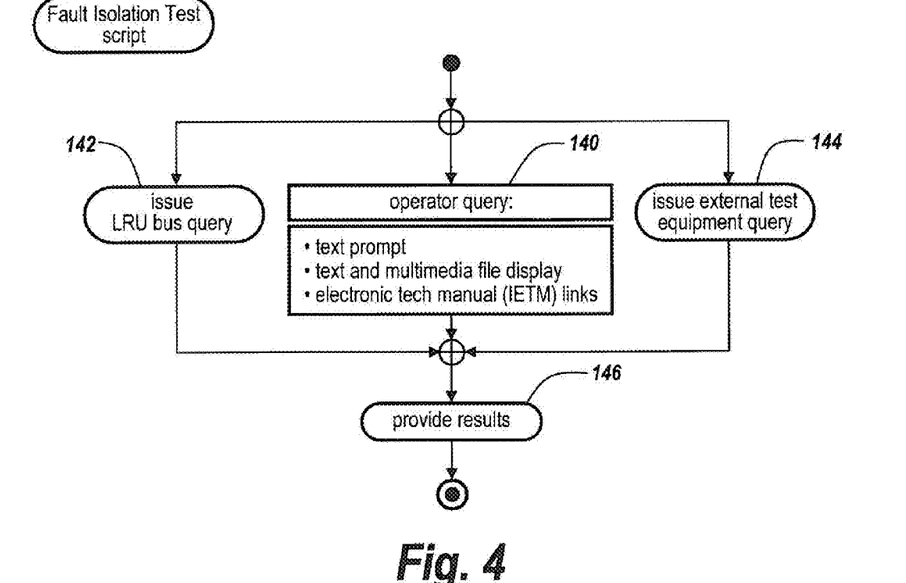

Referring to FIG. 4, the fault isolation test may be prompted by an operator query as illustrated at 140 which may include a text prompt, a text and multimedia file display, or an electronic tech manual link. The fault isolation test may also be issued as illustrated at 142 by an LRU bus query or may be issued by an external test equipment query 144. The results of the fault isolation test, however initiated, are the results 146.

Figure 5:
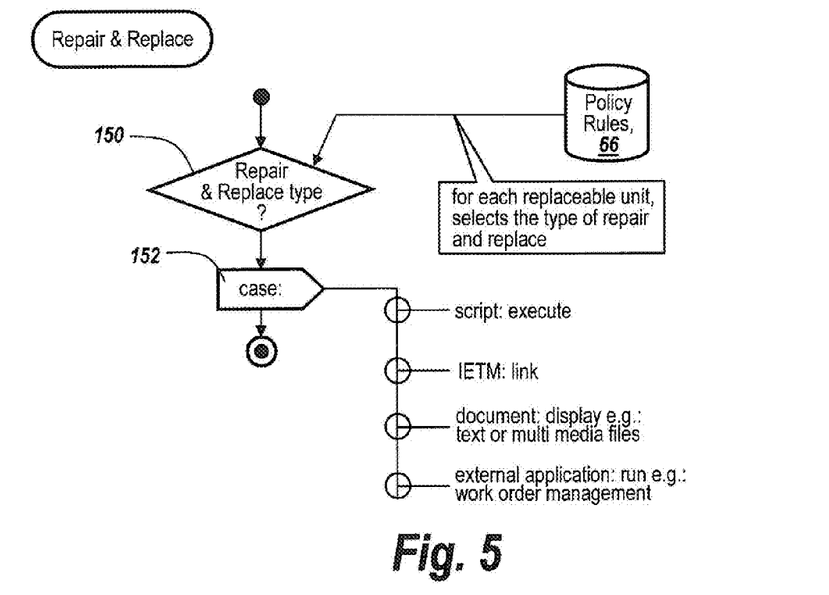

With respect to the repair and replace functionality of the subject module, as illustrated at decision block 150, it is determined from policy rule 66 whether or not the type of cause of the fault is a repair and replace type. Policy rule 66 for each replaceable unit selects the type of repair and replace operation that is appropriate. Having determined that a repair and replace type of operation is required, a case 152 involves a script to initiate execution, the employment of an IETM link, and invokes generation of a document for displaying the repair and replace instructions which can include text or multimedia files. Finally case 152 can invoke an external application to run for instance, a work order management program.

Figure 6:
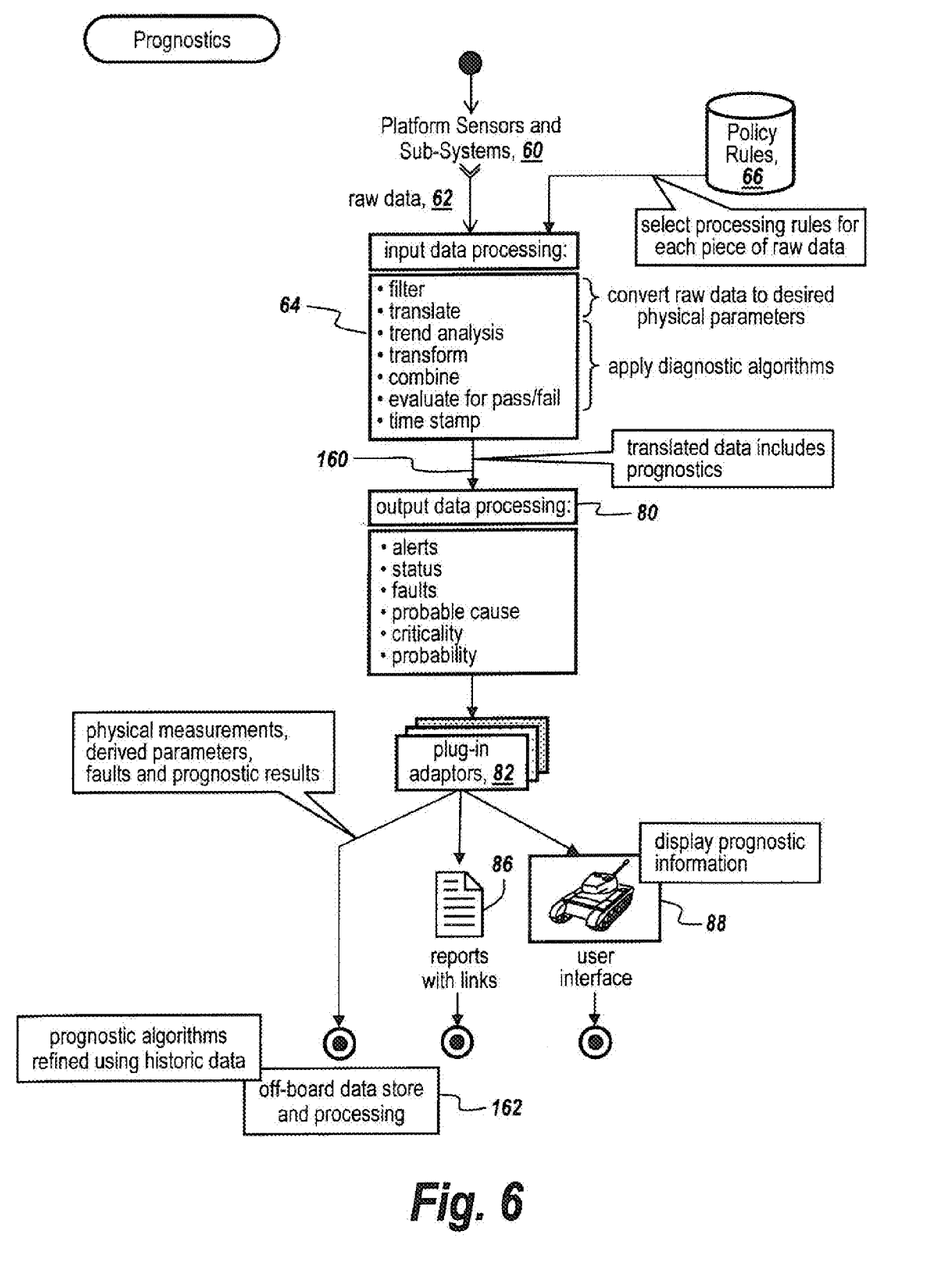

Finally with respect to prognostics and referring now to FIG. 6, this portion of the subject module predicts future platform faults. Here platform and sensor sub-systems 60 output raw data 62 to input data processing block 64 which selects processing rules for each piece of raw data, converts the raw data to desired physical parameters and applies prognostic algorithms to predict future faults.

As illustrated at output 160, the translated data includes prognostics which are applied to the output data processing block 80 that generates alerts, status, faults, probable cause, criticality, and probability data. This data is outputted to plug-in adapters 82 that in one embodiment outputs physical measurements, drive parameters, faults and prognostic results to off-board data store and processing block 162, with the prognostic algorithms refined using historic data. Also as illustrated at 88 the prognostic information is displayed, with reports and links at 86 being updated with the prognostic output.

More particularly, at the platform the subject module provides a Maintenance Management System (MMS) by virtue of the platform interface, the downloading of the entire platform record and the MMS load into a platform record on a Portable Maintenance Aid (PMA) or physical medium attachment.

The module also assists in off-platform activities such as the association of records into generalized maintenance databases, Reliability Centered Maintenance (RCM)/Condition Based Maintenance (CBM+)/diagnostics/prognostics analysis and the translation of data into other information and knowledge-based systems. Tactical platform health status can be maintained, as well as tactical platform logistics and maintenance status. Moreover, original equipment manufacturer support and improvement intelligence is supported by the subject module.

It will be noted that the rules engine initializes the units involved in the measurements, namely metric English or both, defines the input parameters including the Diagnostic Trouble Codes (DTC) for each input parameter, and defines the data transforms to be applied, e.g. offset and scaling; assigns scripts for filtering, calls up complex transforms, generates derived parameters, defines the parameter user-friendly name, defines the parameter units, e.g. inches, pounds per square inch, . . . and defines pass/warn/fail limits for the particular platform involved. Finally, the rules engine specifies the expected repeat rate and time outs for the diagnostic trouble codes.

By way of further explanation, data manager 14 provides the interface to the module from the platform hardware interface adapter. It converts raw data to desired units by directly applying simple transforms or by calling up the appropriate script for the selected complex transform. It also provides data buffering and queue management and evaluates data against pass/fail/warn limits.

In one embodiment, script interpreter 22 incorporate an embedded commercial off-the-shelf script engine, with scripts 24 being stored for filtering, complex transforms and the generation of derived parameters.

Having connected subject module 10 to the platform, when performing a health monitoring function, module 10 software reduces its potential impact on the normal system operation by minimizing the computer memory and CPU cycles needed. This is accomplished by using highly optimized code which is tightly coupled wherever possible. To ensure minimum impact to normal operation, dynamic reasoners are used in a fully automated fashion without manual intervention or operator queries.

Module 10 may be configured to call up any number of dynamic reasoners during health monitoring including those available commercially as long as they meet some key requirements. The requirements include using few CPU resources, the ability to reach conclusions in almost real-time, the ability to operate on a continuing stream of changing input data, the ability to provide ambiguity group results that are expressed in terms of replaceable units that use past as well as failed tests to arrive at reasoning conclusions, the ability to handle single point and multiple point failure sources, the ability to provide a mechanism to document reasoning flows, and the ability to provide a mechanism to perform regression testing.

In the health monitoring mode, rules engine 12 defines which health monitoring reasoning adapter to load and use. Thereafter, the rules engine specifies or maps platform systems to capabilities, e.g. in the case of a vehicle, the mapping of engine capabilities to mobility. The rules engine then makes sure that health monitoring faults to criticality.

Rules engine 12 provides that executive program 16 manage the module software state during startup, health monitoring, maintenance operations, and shut down and maintains the health monitoring fault list including diagnostic trouble codes, DTC, as well as built-in test and other codes. The executive program also sends alerts and requested health monitoring data to report manager 18.

Health monitoring reasoner adapter 32 adapts between standard functions and data formats and reasoner specific functions and data formats. In one embodiment, adapter 32 operates in a bi-directional manner. Reasoner adapter 32 also loads and controls the selected health monitoring reasoner.

It will be appreciated that the dynamic reasoning algorithms of Set 1 are used to reduce ambiguities in the health monitoring fault list as far as possible without executing interactive BIT or fault isolation tests.

Note further that the health monitoring function requires that the reasoner access platform-specific diagnostic model 38. The health monitoring reasoner detects faults and provides a number of suspect causes for a fault, thereby to generate a number of ambiguity groups from which the likely cause of the fault is to be ascertained.

Determination of the likely fault is the function of diagnostics 28 in which module 10 calls up any number of dynamic reasoners in Set 2 during the maintenance operation. The dynamic reasoners may be commercially available as long as they meet the following key requirements. They must be able to start from the ambiguity groups determined during the health monitoring function. They must be able to work with the results of externally controlled test activities and be able to support manually controlled test activities and operate on the results. They must also be able to include the results of test activities to determine the next test to be performed and must be able ultimately to diagnose a failure in terms of replaceable units. Also the dynamic reasoner must be able to handle single point and multiple point failure sources and provide a mechanism to document reasoning flows as well as a mechanism to perform regressive testing.

It will be appreciated that rules engine 12 finds which maintenance operation reasoning adapter to load and use.

In this regard, the maintenance operation reasoning adapter 40 couples selected dynamic reasoning algorithms from Set 2 that access model 38.

After ascertaining the likely cause of the fault, a fault isolation test is performed under the control of script interpreter 44 which employs an embedded script engine and is loaded with scripts 46 which stores scripts for executing interactive BIT and fault isolation test requests.

With respect to output processing, report manager 18 has available to it a number of report plug-ins to load, with the loaded plug-in being controlled by rules engine 12. As a result, report manager 18 loads and controls report plug-ins, with the plug-ins mapping health monitoring, diagnostic and prognostic data in "views" for display, with report manager 18 responsible for logging and report generation.

It is noted that report logs 48 are formatted for data, typically SML data for report generation. Finally, the report manager is coupled to the display or receiving application interface for reporting the likely cause of the fault and to provide immediately-available instructions for the repair of the platform.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A universal on platform system for automatic detection of platform faults and for providing repair or replacement instructions based on the determination of the cause of a fault, comprising:

a module embedded in said platform for sensing platform faults and for providing accurate evaluation of the state of said platform, said module being embedded in said platform and evaluating each likely cause of failure of the detected fault; and, a display for displaying repair and/or replace instructions corresponding to the cause of the fault detected by said module, whereby the unique cause of a fault is determined and detailed targeted repair/replace instructions are provided to address the cause of the fault, said maintenance operation function employing a second set of reasoning algorithms capable of determining at a high level the unique cause of a detected fault, said second set of reasoning algorithms being provided with one or more models of said platform, the information being analyzed by said second set of reasoning algorithms being taken from a suspect list of suspected causes for the detected fault, said module providing a fault isolation test function for specifying tests useful in determining the cause of a detected fault, said fault isolation test function being invoked responsive to the inability of said second set of reasoning algorithms to ascertain a single cause for said fault and a consequent single remove and replace operation.

2. The system of claim 1, wherein said module is reconfigured to accept signals from said platform and for performing health monitoring and maintenance operation of functions based on the utilization of reasoners.

3. The system of claim 2, wherein the reasoners associated with said health monitoring function include a set of reasoning algorithms that access one or more models of said platform to determine that a fault has occurred in said platform, and for outputting the existence of said fault and the cause thereof to said display.

4. The system of claim 3, wherein said set of reasoning algorithms includes low-level reasoning algorithms.

5. The system of claim 4, wherein said low-level reasoning algorithms output a suspect list of suspected causes for the detected fault.

6. The system of claim 2, wherein said reasoners include a dynamic reasoner.

7. The system of claim 2, wherein said reasoners are taken from the group of reasoners consisting of abductive reasoners, Bayesian reasoners, neural reasoners, fault dictionary reasoners, physics-based reasoners and rules-based reasoners.

8. The system of claim 2, wherein said fault monitoring function is performed during the performance of the mission of said platform.

9. The system of claim 2, wherein said maintenance operation function is performed when said platform is not required to perform its mission.

10. The system of claim 1, wherein said second set of reasoning algorithms outputs an ambiguity list indicating failure to isolate a single replaceable component of said platform for repairing a detected fault due to a failure to find a single cause for a detected fault, and wherein said fault isolation test function supplies the name of the next test to be executed to provide information to isolate the cause of said detected fault.

11. The system of claim 10, wherein if said ambiguity group has only one cause for a detected fault, then said module outputs remove and replace instructions to said display.

12. The system of claim 1, wherein said module includes a rules engine, a data manager, an executive program and a report manager, the function of said data manager, executive program and report manager being under control of said rules engine to configure said data manager, executive program and report manager in accordance with the platform into which said module is embedded, thereby to reconfigure said module to the platform in which said module is embedded.

13. The system of claim 1, wherein said module utilizes a dynamic reasoning algorithm including an abductive reasoner coupled to a Bayesian mechanism to calculate the probability or criticality of the result of the hypothesis associated with said abductive reasoner.

14. The system of claim 1, wherein said module outputs prognostics for predicting future failures of said platform.

15. The system of claim 1, wherein the output of said module includes information relating to an immediately-replaceable source of said detected fault or upon the unavailability of an immediately-replaceable source, the output of a suspect list of causes of said fault.

* * * * *